Patented Dec. 15, 1931

1,836,403

UNITED STATES PATENT OFFICE

ERWIN SCHWENK, OF BERLIN-REINICKENDORF, GERMANY, ASSIGNOR TO GENERAL ANILINE WORKS INC., OF NEW YORK, N. Y., A CORPORATION OF DELAWARE

NEW AZODYESTUFFS AND PROCESS OF MAKING SAME

No Drawing. Application filed April 22, 1929, Serial No. 357,347, and in Czechoslovakia April 21, 1928.

My present invention relates to new azodyestuffs of the general formula:

$(R_1-N=N-R_2-NH)_n$—anthraquinone, wherein the anthraquinone nucleus may contain further substituents as for instance amino- or sulfonic acid groups, $n$ means the number 1 or 2, $R_1$ an aryl residue and $R_2$ a radicle capable of being combined with a diazo compound.

These azodyestuffs are produced according to my invention by combining any diazo, tetrazo, or diazoazo compound with an anthraquinone compound of the general formula:

$(R_2-NH)_n$—anthraquinone, wherein $n$, $R_2$ and anthraquinone are of the above mentioned kind.

Suitable radicles capable of being combined with diazo-compounds (signified by $R_2$ in the above formulæ) are for instance: the radicles of aromatic hydroxy carboxylic acids, such as salicylic acid or hydroxy naphthoic acids, or the residues of acylacetic acids or similar compounds or of pyrazolones.

My process is especially suitable for producing dyestuffs on the fiber. In this case the anthraquinone compound, which may be obtained in the usual way, is brought onto the fiber either by means of its alkaline solution, if it is soluble in alkalies, or in the form of its leuco compound in the manner customary in dyeing with vat dyestuffs. Or, if the anthraquinone compound used contains sulfonic acid groups, the fiber may be treated therewith in like manner as with an acid anthraquinone dyestuff. Thereafter the fiber thus prepared and being or not being intermediately dried is developed by means of a diazo-compound. The development may also be effected by one of the usual printing processes.

In order to further illustrate my invention the following examples are given; but I wish it to be understood that I am not limited to the particular conditions nor to the specific products mentioned therein.

Example 1

2 grs. of 2-(2'-hydroxy-3'-naphthoyl-amino)-anthraquinone are made into a paste with some Turkey red oil and 20 ccm. of water and vatted at room temperature with 3 ccm. of a caustic soda solution of 34° Bé. and 1 gr. of sodium hydrosulfite. After 15 minutes the vat is made up with water to 400 ccm. In this vat 20 grs. of well boiled cotton yarn are handled for half an hour, then squeezed off, hanged and well rinsed in the cold.

The cotton material thus prepared is developed with a diazo-solution neutralized with sodium acetate, containing per liter 1.52 grs. of 5-nitro-2-amino-1-methyl-benzene and well rinsed and soaped.

In this manner a bright scarlet red dyeing of a very good fastness is obtained. The dyestuff thus produced on the fiber corresponds to the formula:

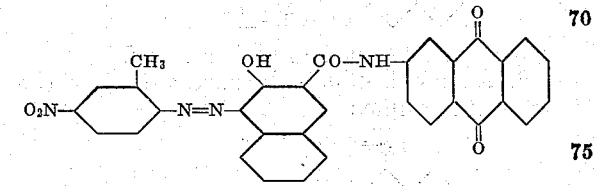

In like manner a clear orange shade is obtained by developing the fiber prepared as above described with diazotized 2.5-dichloro-aniline. A claret red shade is obtained when using diazotized 5-nitro-2-amino-1-methoxy-benzene; this dyestuff has the formula:

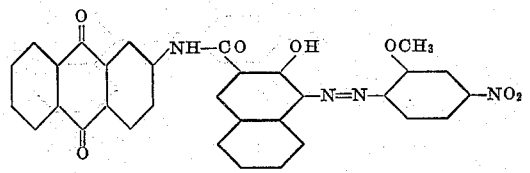

1-(2'-hydroxy-3'-naphthoyl-amino)-anthraquinone yields when developed with diazotized 2.5-dichloro-aniline a yellowish orange dyeing.

*Example 2*

20 grs. of well boiled cotton yarn are handled for half an hour with a vat prepared from 2 grs. of 2.6-di-(2'-hydroxy-3'-naphthoyl-amino)-anthraquinone in like manner as described in Example 1. Then the yarn is squeezed off, hanged and well rinsed in the cold. The material thus prepared is developed with a diazo-solution neutralized with sodium acetate, containing per liter 1.7 grs. of 5-nitro-2-amino-1-methoxy-benzene and well rinsed and soaped.

In this manner a claret red dyeing of a very good fastness is obtained. The dyestuff thus produced on the fiber corresponds to the formula:

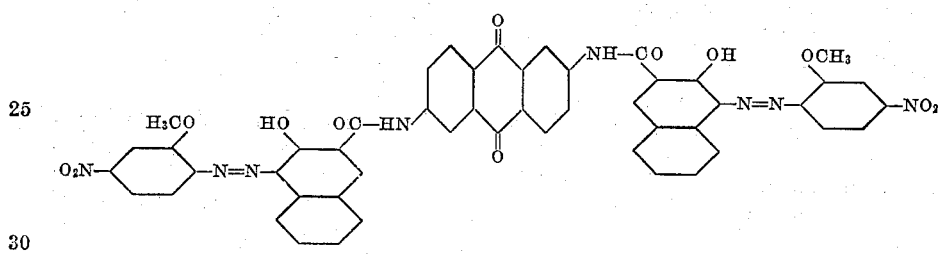

By developing the fiber prepared as above described with 5-chloro-2-amino-1-methyl-benzene a scarlet red dyeing is produced.

I wish to be understood that in the following claims the term "combining" means combining in substance or on a substratum, especially on the fiber.

I claim:—

1. A process which comprises combining any diazo compound with an anthraquinone compound of the general formula:

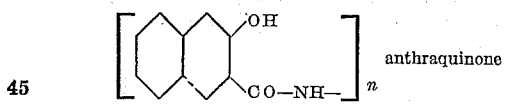

wherein $n$ means the number 1 or 2.

2. As new products the azodyestuffs of the general formula:

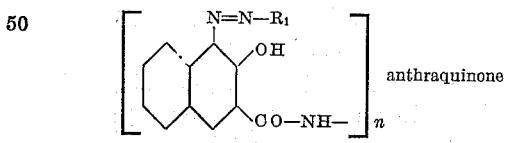

wherein $n$ means the number 1 or 2 and $R_1$ a residue of the benzene series, which compounds are, when dry, colored powders yielding when produced on the fiber fast dyeings and printings.

3. As new products the azo dyestuffs of the general formula:

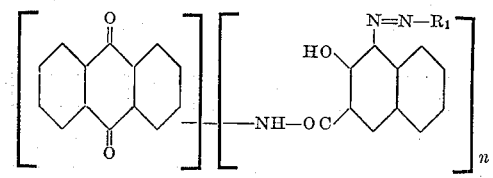

wherein $n$ means the number 1 or 2 and $R_1$ represents a phenyl residue, which compounds are when dry colored powders yielding when produced on the fiber fast dyeings and printings.

4. As new products the azo dyestuffs of the general formula:

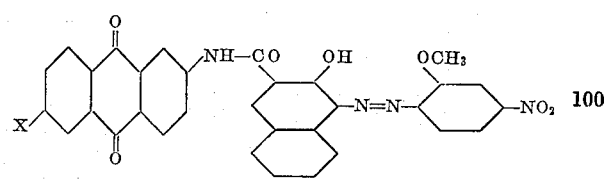

wherein X stands for hydrogen or the residue:

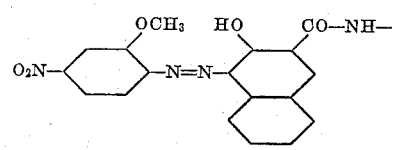

which compounds are when dry colored powders yielding when produced on the fiber fast dyeings and printings.

5. As a new product the azodyestuff of the following formula:

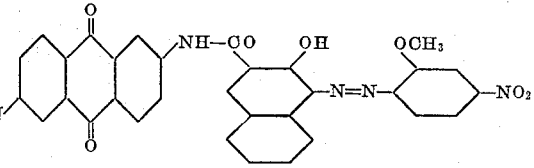

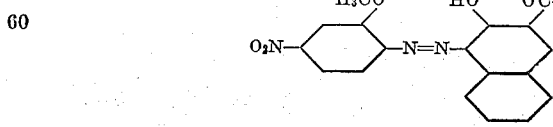

yielding when produced on the fiber a claret red dyeing of good fastness.
6. As a new product the azo dyestuff of the following formula:
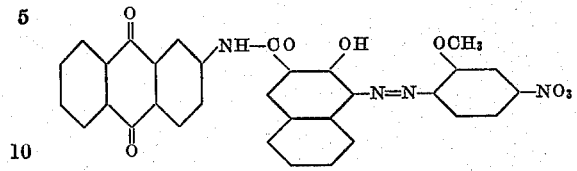
yielding when produced on the fiber a claret red shade of good fastness.
In testimony whereof, I affix my signature.
ERWIN SCHWENK.